(12) United States Patent
Chawda et al.

(10) Patent No.: US 11,442,725 B1
(45) Date of Patent: Sep. 13, 2022

(54) SOFTWARE MODERNIZATION REFACTORING OF LOCAL CALLS TO NETWORK CALLS

(71) Applicant: Amazon Technologies, Inc., Seattle, WA (US)

(72) Inventors: Vivek Chawda, Palo Alto, CA (US); Koushik Rajagopal, Milpitas, CA (US); Daniel John Scholl, San Ramon, CA (US); Roland Mesde, Cupertino, CA (US); Sophia Tsang, Newark, CA (US); Samartha Chandrashekar, Bellevue, WA (US); Sushil Ravoori, Fremont, CA (US); Sriram Venkatadri, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/110,726

(22) Filed: Dec. 3, 2020

(51) Int. Cl.
| | |
|---|---|
| *G06F 8/76* | (2018.01) |
| *G06F 8/72* | (2018.01) |
| *G06F 8/40* | (2018.01) |
| *G06F 8/60* | (2018.01) |
| *G06F 8/30* | (2018.01) |
| *G06F 9/22* | (2006.01) |

(52) U.S. Cl.
CPC .................. *G06F 8/76* (2013.01); *G06F 8/30* (2013.01); *G06F 8/40* (2013.01); *G06F 8/60* (2013.01); *G06F 8/72* (2013.01); *G06F 9/22* (2013.01)

(58) Field of Classification Search
CPC .............. G06F 8/76; G06F 11/30; G06F 9/22; G06F 8/72; G06F 8/40; G06F 8/60
See application file for complete search history.

(56) References Cited

U.S. PATENT DOCUMENTS

| | | | |
|---|---|---|---|
| 9,772,835 B1* | 9/2017 | Trautmann | G06F 9/455 |
| 2018/0287883 A1* | 10/2018 | Joshi | G06F 9/45558 |
| 2019/0108067 A1* | 4/2019 | Ishikawa | H04L 41/50 |
| 2020/0382445 A1* | 12/2020 | Calmon | H04L 47/821 |
| 2021/0232390 A1* | 7/2021 | Hwang | H04L 41/16 |
| 2021/0294601 A1* | 9/2021 | Vs | G06Q 40/12 |

* cited by examiner

*Primary Examiner* — Wei Y Zhen
*Assistant Examiner* — Amir Soltanzadeh
(74) *Attorney, Agent, or Firm* — Thomas | Horstemeyer, LLP

(57) ABSTRACT

Disclosed are various embodiments for the refactoring of local calls to network calls during software modernization. First and second application components are identified based on analysis of a computing application. A local call from the first application component to a process of the second application component is identified, and an independently deployable microservice is created from the computing application. The independently deployable subunit comprises the second application component having a network endpoint. The independently deployable microservice is deployed such that the process is accessible to the first application component via the network endpoint. The local call is programmatically refactored into a network call from the first application component to the process of the second application component.

18 Claims, 15 Drawing Sheets

Software Modern. ✕
Service 135

Applications

Documentation

Application Migration > Applications

Get Started

Application Migration Service
This tool facilitates the customer's process of identifying functionalities to extract as independent services and assists in the deployment of these independent services as a network or cloud computing service

1
Onboard application
Onboard application binary and metadata with a local file path or file location.

2
Launch visualization
After onboarding, use visualization/analysis tools to identify and label facets of the application that you intend to extract as independent services.

3
Manually refactor
Help guide the refactoring of code by identifying dependencies in the application to remove and enable customers to label business domains.

4
Deployment
When the extracted services are ready to be deployed, we help replace internal API calls calling the extracted service to network API calls, and deploy the independent services.

[View details] [Launch visualization]  [Onboard Application]

Applications (1/160)
.NET and Java web applications that contains buildable source code and its dependencies 🔍 *filter components by name*

| ○ | Name | Application type | Source code location | Build status | Date created |

No applications have been onboarded

[Onboard Application]

Original Application
```
public class LoanComputation {
    public static void MainMethod() {
903a────IndependentClass1 class1 = new IndependentClass1();
         IndependentClass2 class2 = new IndependentClass2();
    } }
public class IndependentClass1 {
        private TransitiveDependencyClass1 transitiveDependencyClass1;
        private TransitiveDependencyClass2 transitiveDependencyClass2;
        public IndependentClass1() {
            transitiveDependencyClass1 = new TransitiveDependencyClass1();
            transitiveDependencyClass2 = new TransitiveDependencyClass2();
        }
903b────public string MainMethod() {
            var value1 = transitiveDependencyClass1.Method();
            var field = transitiveDependencyClass1.field;
            var value2 = transitiveDependencyClass2.Method();
            var field2 = transitiveDependencyClass2.field;
            var sField = TransitiveDependencyClass1.STATIC_FIELD;
            var rval = value1 + " + " + value2;
            return "IndependentClass1";
    } }
```
↘ 156

FIG. 10

Extracted Functionality
```
public class IndependentClass1 : ControllerBase {
    private TransitiveDependencyClass1 transitiveDependencyClass1;
    private TransitiveDependencyClass2 transitiveDependencyClass2;
    public IndependentClass1() {
        transitiveDependencyClass1 = new TransitiveDependencyClass1();
        transitiveDependencyClass2 = new TransitiveDependencyClass2();
    }
    [HttpPost]
    [Route("/MainMethod")]                                  ~903c
    public string MainMethod() {
        var value1 = transitiveDependencyClass1.Method();
        var field = transitiveDependencyClass1.field;
        var value2 = transitiveDependencyClass2.Method();
        var field2 = transitiveDependencyClass2.field;
        var sField = TransitiveDependencyClass1.STATIC_FIELD;
        var rval = value1 + " + " + value2;
        return "IndependentClass1";
    }
}
```

*FIG. 11*

Refactored Application
```
public class LoanComputation {
    public static void Main() {
        IndependentClass1_APIGW_Implementation class1 = new       ~903d
            IndependentClass1_APIGW_Implementation();
        IndependentClass2 class2 = new IndependentClass2();
    }
}
public class IndependentClass1_APIGW_Implementation {
    public string MainMethod() {
        return new HttpAPIInvoker().invoke("                       ~903e
                        https://execute-api/MainMethod");
    }
}
```

*FIG. 12*

SOFTWARE MODERNIZATION REFACTORING OF LOCAL CALLS TO NETWORK CALLS

BACKGROUND

Monolithic computing applications generally include software applications in which libraries, user interfaces, and other application components are bundled into a single program coded to be executable on a single platform. In other words, monolithic applications include those that are self-contained and independent from other computing applications. Many legacy enterprise applications tend to be monolithic applications that inefficiently allocate resources and prohibit increased scale in context of modern computing requirements. Modernizing monolithic and other legacy computing applications is a common task for business organizations and other entities desiring to improve their information technology (IT) environments in response to changing software application use cases, resource demands, and user access patterns.

For example, while many legacy applications were designed for older operating environments with lesser expectations, modern applications now often need the ability to scale quickly to potentially millions of users, have global availability, manage very large amounts of data, and respond to requests without delay. The processes for upgrading, converting, rewriting, etc., such applications to enable improved performance is referred to generally as software modernization.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2-7 are drawings of various user interfaces served up by the networked environment of FIG. 1 according to various embodiments of the present disclosure.

FIGS. 10-12 are example portions of source code according to various embodiments of the present disclosure.

DETAILED DESCRIPTION

Figure 1:
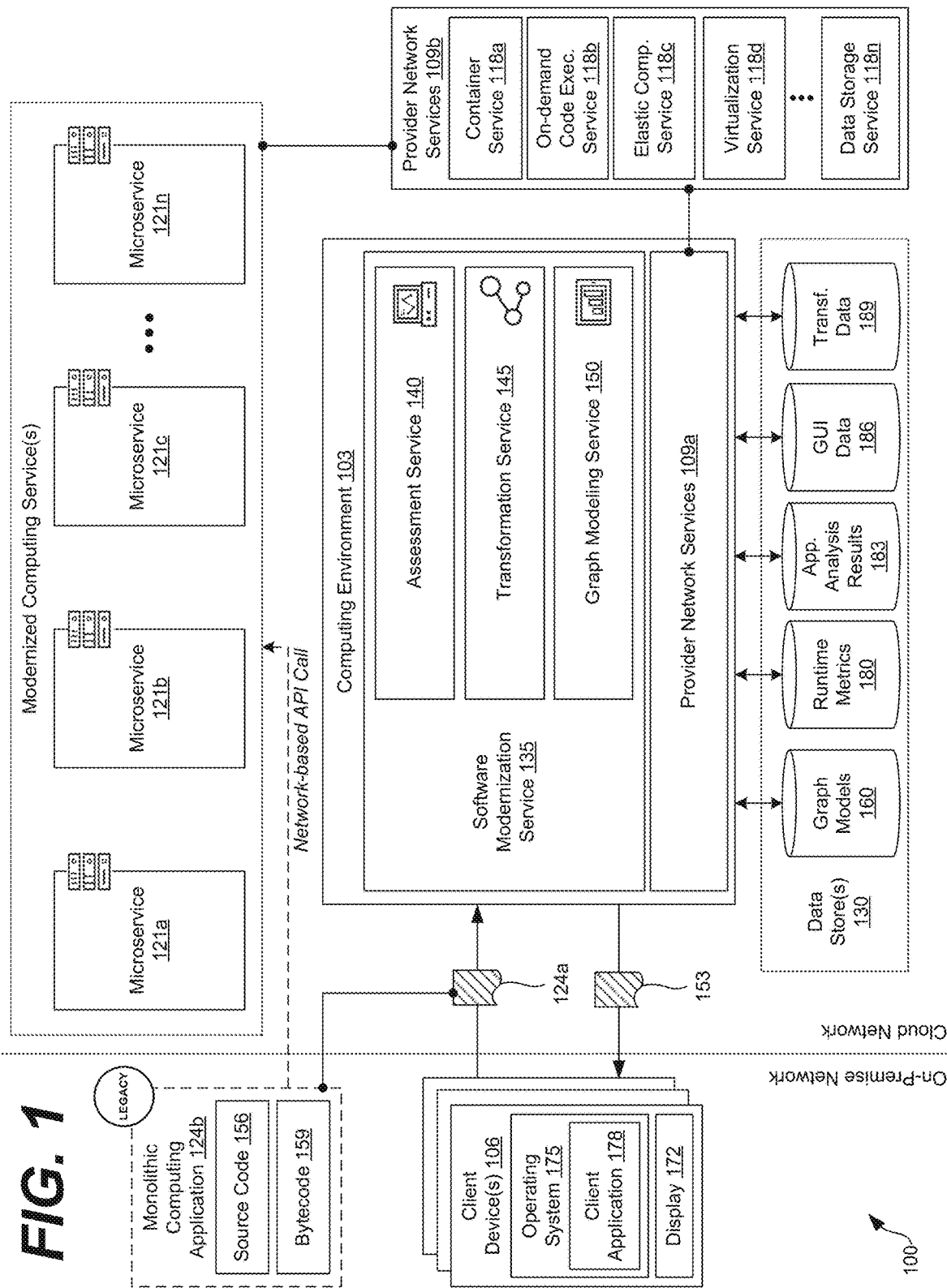
FIG. 1 is a drawing of a networked environment according to various embodiments of the present disclosure.

The present disclosure relates to a service that assists customers with decomposing their monolith applications running on premises into microservices and automatically deploys (or automatically creates a deployable version of) these microservices as serverless functions, virtual machines (including microVMs), and/or containers. Specifically, the present disclosure relates to automated detection of "islands" within a monolith, that is, portions of its code that are lightly connected or not connected to other portions, to visualization of these islands and their bridges to other islands for facilitating any manual bridge breaking efforts required from the customer, and to automated extraction of islands into discrete microservices.

Generally, software modernization refers to converting, rewriting, or porting legacy software applications or systems to more modern computer programming languages, software libraries, protocols, hardware platforms, application architectures, cloud-based services, and the like. Legacy software applications often include monolithic computing applications, such as a single enterprise application that is deployed across various business domains of the enterprise, even when the business domains are often unrelated.

Users, business organizations, and other entities often desire to modernize their various software applications and systems to improve operational performance, increase application availability, reduce exposure to vulnerabilities (e.g., software crashes, security vulnerabilities, etc.), migrate applications from non-cloud environments to infrastructure provided by a cloud services provider (e.g., to leverage a cloud service's provider reliable infrastructure, increased performance benefits, etc.), and to enable more efficient ongoing development of the applications, among other reasons.

In many cases, monolithic applications have limited ability to respond to changes in requirements and thus, higher engineering and operational costs are incurred. For instance, monolithic applications tend to have a single code base that implements multiple business capabilities whose ownership spans multiple teams, which results in the need to anticipate and account for code conflicts during development and coordinate releases across teams. Customers are increasingly looking to transform their applications to microservices to address these challenges. However, breaking apart monolithic applications into microservices has its own set of challenges, including the identification of functionalities that can become new services and their extraction. Today, customers use separate tools to analyze source code and runtime behavior of applications and manually correlate their results to identify the functionalities to be extracted as separate services while employing processes such as domain-driven design. They then manually refactor or rewrite parts of their applications to decompose into independent services.

As such, the present disclosure relates to identifying application components that may be independently deployable and, in other words, application components that may be extracted from a computing application that may be deployed independent of other components of the computing application, as well as extracting and deploying the extracted application components independent of the computing application. The presently disclosed modernization service can guide users through the process of identifying functionalities to extract as independent services and can assist in the refactoring of applications into microservices that improve business agility.

In some embodiments, a software modernization service is executed to identify application components from a source code file or a bytecode file of a computing application, where the application components may include packages, files, classes, methods, data objects, and the like. The software modernization service may generate a graph model representative of the computing application. The graph model may include, for example, nodes representative of the application components of the computing application. The graph model may further include bridges connecting some nodes to other nodes. The bridges are representative of dependencies between nodes.

The software modernization service may generate the graph model such that at least one of the nodes is an isolated node, also referred to as an island, having less than a threshold number of bridges connecting to other ones of the nodes. The lack of bridges indicates that an application component corresponding to the isolated node may potentially be an independently deployable component. The software modernization service may further cause a display of one or more user interfaces having a graphical representation of the graph model to facilitate automatic or manual removal of bridges and ultimately extract application components from a computing application for deployment elsewhere.

The software modernization service may assist those transitioning or migrating monolithic computing applications, or components thereof, to network services such that minimal code changes are required, for instance, through branch-by-abstraction techniques in the field of computer science. Further, benefits of existing network services may be extended to the services extracted from the monolithic computing application, such as load balancing, secure endpoint authentication, workload hosting, etc.

The software modernization service described herein simplifies the many steps required to transform monolithic applications (e.g., ASP.NET monolithic applications) into services or microservices. The software modernization service may assist developers in identifying parts of their application that can be extracted as new services by analyzing source code and runtime metrics. Further, the software modernization service may create a visual graph or other visual representation of the application that removes the need for customers to manually correlate the results of code analysis and runtime metrics using multiple tools. The software modernization service may then help guide the refactoring of code by identifying dependences in the application to remove and enabling customers to label business domains. After an application is refactored based on guidance provided by the embodiments described herein, the software modernization service may help break out the codebase into separate repositories that various teams can develop, build, deploy, and operate independently. During the refactoring process, the software modernization service may flag known deviations from best practices of domain-driven design principals and constraints that apply while deploying to various services, such as expected startup and network latencies.

In some embodiments, the software modernization service makes it easier to transform, for example, JAVA and ASP.NET applications into independent services deployed on a network-based service. As such, the software modernization service may provide faster identification of parts of applications to carve out into microservices. Further, the software modernization service may consolidate data from code analysis and runtime profiling to produce a single visualization showing metrics for each component and dependencies between them. This prevents the need to manually correlate the output of different tools for code analysis and runtime analysis. The software modernization service may further identify application programming interface (API) endpoints that are candidates to be carved out as independent services (e.g., based on the coupling between components, call counts, etc.).

The software modernization service may guide application refactoring based on domain-driven design principals, helping users and administrators adopt and use industry best practices through the labeling of business-domains. The software modernization service may analyze labeled domains to suggest areas to focus on for refactoring and group metrics and at the level of each business domain. The software modernization service may further assist in the refactoring of monolith codebases into units that can be developed, built, deployed, and operated separately. After monolithic application are refactored into microservices, functionalities may be prepared for extraction as independent services. The software modernization service may be used to partition source code into units that teams can develop and deploy as independent services.

In the following discussion, a general description of a system having a software modernization service and its components is provided, followed by a discussion of the operation of the same.

With reference to FIG. 1, a networked environment 100 is shown according to various embodiments. The networked environment 100 includes a computing environment 103, a client device 106, and various provider network services 109*a*, 109*b* (collectively "provider network services 109") that are in data communication with each other via a network. The network includes, for example, the Internet, intranets, extranets, wide area networks (WANs), local area networks (LANs), wired networks, wireless networks, or other suitable networks, etc., or any combination of two or more such networks. Such networks may include satellite networks, cable networks, Ethernet networks, and other types of networks.

The networked environment 100 may include a cloud provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network may be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The networked environment 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

The provider network services 109 may include web services or cloud provider services that may be invoked using a network service call or an API call made to a network-based API. An API refers to an interface and/or communication protocol between a client and a server, such that if the client device 106 makes a request in a predefined format, the client device 106 would receive a response in a specific format and/or initiate a predefined action. In a cloud provider network context, APIs provide a gateway for customers to access cloud or remote computing infrastructure by allowing customers to obtain data from or cause actions within the cloud provider network, enabling the development of applications that interact with resources and services hosted in the cloud provider network. APIs can also enable different services of the cloud provider network to exchange data with one another. The provider network services 109 may be independent of the computing environment 103 in some examples, as shown in FIG. 1, and may be operated by a third-party. Alternatively, the provider network services 109 may be a portion of the computing environment 103, and may be maintained and/or operated by a common entity.

In accordance with various embodiments, the provider network services 109 may include one or more of a container orchestration and management service 118a (referred to in various implementations as a container service, cloud container service, container engine, or container cloud service), an on-demand code execution service 118b (also referred to as a serverless compute service, function compute service, functions service, cloud functions service, or functions-as-a-service, in various implementations), an elastic computing service 118c (referred to in various implementations as an elastic compute service, a virtual machines service, a computing cloud service, a compute engine, or a cloud compute service), a data storage service 118n, as well as other types of provider network services 109 as can be appreciated.

The elastic computing service 118c may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

It will be appreciated that such virtualized instances may also be able to run in other environments, for example on the premises of customers, where such on-premise instances may be managed by the cloud provider or a third party. In some scenarios the instances may be microVMs. The cloud provider network may offer other compute resources in addition to instances and microVMs, for example containers (which may run in instances or bare metal) and/or bare metal servers that are managed by a portion of a cloud provider service running on an offload card of the bare metal server.

In some embodiments, the execution of compute instances by the compute service 118*d* is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core). A microVM can be used in some implementations to run a containerized workload.

The container orchestration and management service 118*a* can be enable customers to run containerized workloads, for example on their own instances or on managed instances through a serverless container service. A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). A container image is a standalone, executable package of software that includes everything needed to run an application process: code, runtime, system tools, system libraries and settings. Container images become containers at runtime. Containers are thus an abstraction of the application layer (meaning that each container simulates a different software application process). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, other configurations) used to enable the application to run in a container engine.

The data storage service 118*n*, for example, may be an elastic block store service (also referred to as a cloud disks service, managed disk service, storage area network service, persistent disk service, or block volumes, in various implementations) that supports customer volumes. In general, a volume can correspond to a logical collection of data, such as a set of data maintained on behalf of a user. The data of the volume may be erasure coded and/or replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned.

The provider network services 109 may be employed to deploy one or more microservices 121*a* . . . 121*n* that perform various functions of a legacy computing application. For instance, an application component, such as a method, a class, a data object, and so forth, may be extracted from a monolithic computing application 124*a*, 124*b* and its equivalent code or functionality deployed as a microservice 121 offered up by one of the provider network services 109, thereby replacing the application component of the monolithic computing application 124 as part of a software modernization process. While the microservices 121 are referred to herein as "microservices" they may also be referred to as "services."

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed techniques can be used to programmatically decompose the monolithic computing application 124b into microservices 121a-121n.

Various applications and other functionality may be executed in the computing environment 103 according to various embodiments. Also, various data is stored in a data store 130 that is accessible to the computing environment 103. The data store 130 may be representative of a plurality of data stores 130 as can be appreciated. The data stored in the data store 130, for example, is associated with the operation of the various applications and/or functional entities described below.

The components executed on the computing environment 103, for example, include a software modernization service 135, and other applications, services, processes, systems, engines, or functionality not discussed in detail herein. The software modernization service 135 is executed to migrate all or a portion of the monolithic computing application 124 to one or more modern computing services. For instance, various application components may be "carved out" or extracted from the monolithic computing application 124 and executed as a microservice 121.

To this end, the software modernization service 135 includes an assessment service 140, a transformation service 145, and a graph modeling service 150, among other services. The assessment service 140 is executed to generate various recommendations 153 associated with a monolithic computing application 124 or other computing application or service. The recommendations 153 may include types of software modernization assessments and recommendations determined based on application component derived from a source code 156 and/or bytecode 159 of a monolithic computing application 124.

The recommendations 153 generated by the assessment service 140 may include recommended modernization strategies, recommended modernization tools, estimated modernization costs, recommended ones of the provider network services 109 to deploy one or more of the application components, etc. Further, the recommendations 153 generated by the assessment service 140 may include independently deployable application components identified based on an assessment of a monolithic computing application 124.

The transformation service 145 is executed to extract portions of the monolithic computing application 124, referred to as application components or application artifacts, and generate an independently deployable component. In some embodiments, the independently deployable component is a microservice 121 offered by one or more of the provider network services 109. For instance, a method, a class, or other application may be identified as being an independently deployable component. The transformation service 145 may translate the method, class, or other application component to a container for execution by the container service 118a, a script executable by the on-demand code execution service 118b, and so forth, to create a microservice 121. The transformation service 145 may modify code of the monolithic computing application 124 that invokes the microservice 121, for instance, through a network-based API call, as opposed to a local call.

The graph modeling service 150 is executed to generate a graph model 160 for a monolithic computing application 124 that is representative of the monolithic computing application 124. In some embodiments, the graph model 160 includes various nodes, where each of the nodes corresponds to one of the application components identified from the monolithic computing application 124. Further, the graph model 160 may include bridges connecting some nodes to other nodes based on dependency relationships. In some embodiments, the graph model 160 is generated such that at least one of the nodes is an isolated node, or an island, having less than a threshold number of bridges connecting to other ones of the nodes, as will be described, indicating that the isolated node is a candidate for extraction as potentially being an independently deployable component of the monolithic computing application 124.

The client device 106 is representative of a plurality of client devices that may be coupled to the network. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 172. The display 172 may include, for example, one or more devices such as liquid crystal display (LCD) displays, gas plasma-based flat panel displays, organic light emitting diode (OLED) displays, electrophoretic ink (E-ink) displays, LCD projectors, or other types of display devices, etc.

The client device 106 may be configured to execute various applications such as a client application 178 and/or other applications. The client application 178 may be executed in a client device 106, for example, to access network content served up by the computing environment 103 and/or other servers, thereby rendering a user interface on the display 172. To this end, the client application 178 may comprise, for example, a browser, a dedicated application, etc., and the user interface may include a network page, an application screen, etc. The client device 106 may be configured to execute applications beyond the client application 178 such as, for example, email applications, social networking applications, word processors, spreadsheets, and/or other applications.

Next, a general description of the operation of the various components of the networked environment 100 is provided. To begin, it is understood that an enterprise or other entity may offer and maintain a monolithic computing application 124 or other type of computing application requiring modernization to more efficiently maintain or deploy the computing application. As modern computing trends are moving towards virtualization of desktop environments, monolithic computing applications 124 tend to inefficiently allocate resources and do not scale well.

For instance, assume a monolithic computing application 124 is used by a human resources (HR) department, an accounting department, a sale department, an engineering department, and all other departments of an enterprise. As may be appreciated, human resources personnel would likely not utilize sales functionality of the monolithic computing application 124, and vice versa. As such, executing the monolithic computing application 124 as a container or in a virtual desktop session for each individual in an enterprise may use a significant amount of memory even though a notable portion of the monolithic computing application 124 is not utilized by various individual users.

As such, domain-driven design principals are utilized to recommend deploying various portion of the monolithic computing application 124 as a microservice 121. First, an administrator may upload a monolithic computing application 124 or other computing application to the computing environment 103. It is understood that the monolithic computing application 124 may include source code 156 and bytecode 159 which may accessed from one or more source code and/or bytecode files.

Next, the assessment service 140 analyzes the monolithic computing application 124 and identifies application components based on an inspection of the source code 156 and the bytecode 159. Further, the assessment service 140 may execute an application binary of the monolithic computing application 124 using test data and generate runtime metrics 180. The runtime metrics 180 may include, for example, a response time when invoking one of the class or the method, a number of times a respective method or class is invoked, a number of static dependencies of an application component, a number of runtime dependencies of an application component, a number of data stores 130 or databases accessed, a number of queries to the data stores 130 or the databases per unit of time, a frequency of invoking an application component, central processing unit (CPU) usage per unit of time, memory usage per unit of time, bandwidth, as well as other runtime metrics 180 as may be appreciated.

Ultimately, the assessment service 140 generates application analysis results 183, which may be used to generate one or more recommendations 153 to be sent to the client device 106. To this end, in some embodiments, the assessment service 140 may interface with the graph modeling service 150 to generate a graph model 160 representative of the monolithic computing application 124. The graph model 160 may include a data object (e.g., a JSON data object) or a structured data file (e.g., an XML file) in some embodiments.

The graph model 160 may include a multitude of nodes, each of the nodes corresponding to one of the application components. Further, the graph model 160 may include bridges that connect some nodes to other nodes based on dependency relationships between the nodes. For instance, if one application component calls or invokes another application component, it is understood that a bridge would connect nodes corresponding to these application components in the graph model 160.

In some embodiments, the graph model 160 is generated such that at least one of the nodes is an isolated node, also referred to as an island, having less than a threshold number of bridges connecting to other ones of the nodes. The threshold number of bridges may include, for example, one, two, or three bridges. Alternatively, the threshold number of bridges may be another number of bridges based on a desired setting. In any event, a lack of bridges connecting to a node may indicate that an application component corresponding to the node is a potential independently deployable component as it is not dependent on other application components. Additionally, the graph model 160 may include the runtime metrics 180 generated during execution of the application binary.

Accordingly, the assessment service 140 may identify one or more isolated nodes from the graph model 160 and generate a recommendation 153 to extract the corresponding application components. To this end, the software modernization service 135 may generate graphical user interface (GUI) data 186 to send to the client device 106 to cause a display of at least one user interface comprising a graphical representation of the graph model 160. As such, the GUI data 186 may include images, hypertext markup language (HTML) code, or a script to graphically display the graph model 160 as well as its nodes and bridges. In some embodiments, the runtime metrics 180 may be positioned proximate to a corresponding one of the nodes or the bridges in the graphical representation of the graph model 160.

The administrator of the client device 106 may then direct the software modernization service 135 to extract one or more of the isolated nodes, or may manually revise the source code 156 or bytecode 159 of the monolithic computing application 124 to remove one or more bridges.

If an application component is capable of extraction by the software modernization service 135, the transformation service 145 may identify an application component to be extracted and transform the application component such that it may be deployed as a microservice 121 using one or more of the provider network services 109. The transformation service 145 may utilize transformation data 189, which may include various rules and logic, to transform data from a first format to a second format. In some embodiments, the first format includes code for local execution on a client device 106 and the second format includes code for execution by one of the provider network services 109. In some embodiments, the first format includes a first programming language (e.g., JAVA®) and the second format includes a second programming language (e.g., C++).

In additional embodiments, the first format includes language for a first host operating system (e.g., a Windows server) and the second format includes language for a second and different host operating system (e.g., a Linux server). In some embodiments, the first format includes code in a defined language but part of a first version of a codebase framework, and the second format includes code in the defined language but part of a second, newer version of the codebase framework.

Ultimately, when the application component is extracted by the software modernization service 135, a program execution service may execute the application component as extracted on a network-based service such that the application component is accessible through a network-based API. The program execution service may include one of the provider network services 109, for instance, the container service 118a, the on-demand code execution service 118b, the elastic computing service 118c, the virtualization service 118d, or other suitable service.

Further, the transformation service 145 may modify the source code 156 or the bytecode 159 to replace a call to the respective one of the application components to be extracted with a call to the independently deployable component (e.g., a network API call to a microservice 121).

While various embodiments described herein relate to the software modernization service 135 being executed in a computing environment 103 remote from the client device 106, in alternative embodiments, the operations performed by the software modernization service 135 may be performed by a client application 178 locally on the client device 106.

Figure 3:
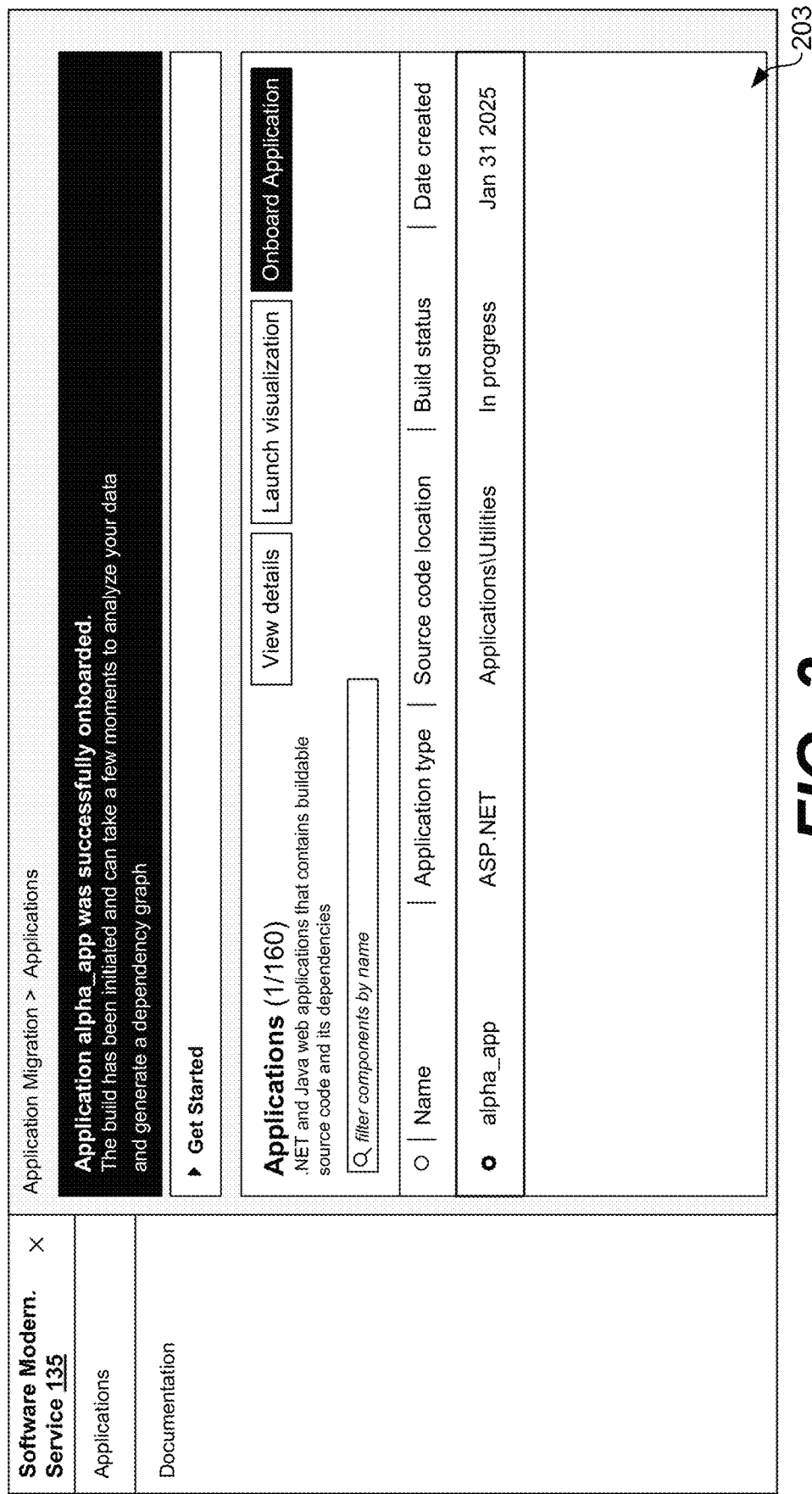

Referring next to FIGS. 2 and 3, non-limiting examples of user interfaces 203 generated by the software modernization service 135 are shown according to various embodiments. To modernize a computing application, such as a monolithic computing application 124, the software modernization service 135 may generate a portal comprising a series of user interfaces 203 that permit a user to analyze a computing application, identify isolated nodes, migrate portions of the computing application to a modernized computing service, as well as perform other functions as described herein.

The user interface 203 of FIG. 2 may be used to onboard an application, for instance, by uploading one or more files corresponding to a monolithic computing application 124. As may be appreciated, the one or more files may include source code 156 and/or bytecode 159. The user interface 203 of FIG. 3 shows an example application, alpha_app, which has been uploaded to the software modernization service 135. FIG. 3 shows that alpha_app has an "ASP.NET" application type, which may indicate that the alpha_app was developed using the ASP.NET web server framework. It is understood that other application types, such as JAVA® and other application types, may be supported. The user interfaces 203 of FIGS. 2 and 3 facilitate selection of one of a multitude of applications for analysis and extraction, as may be appreciated.

Figure 4:
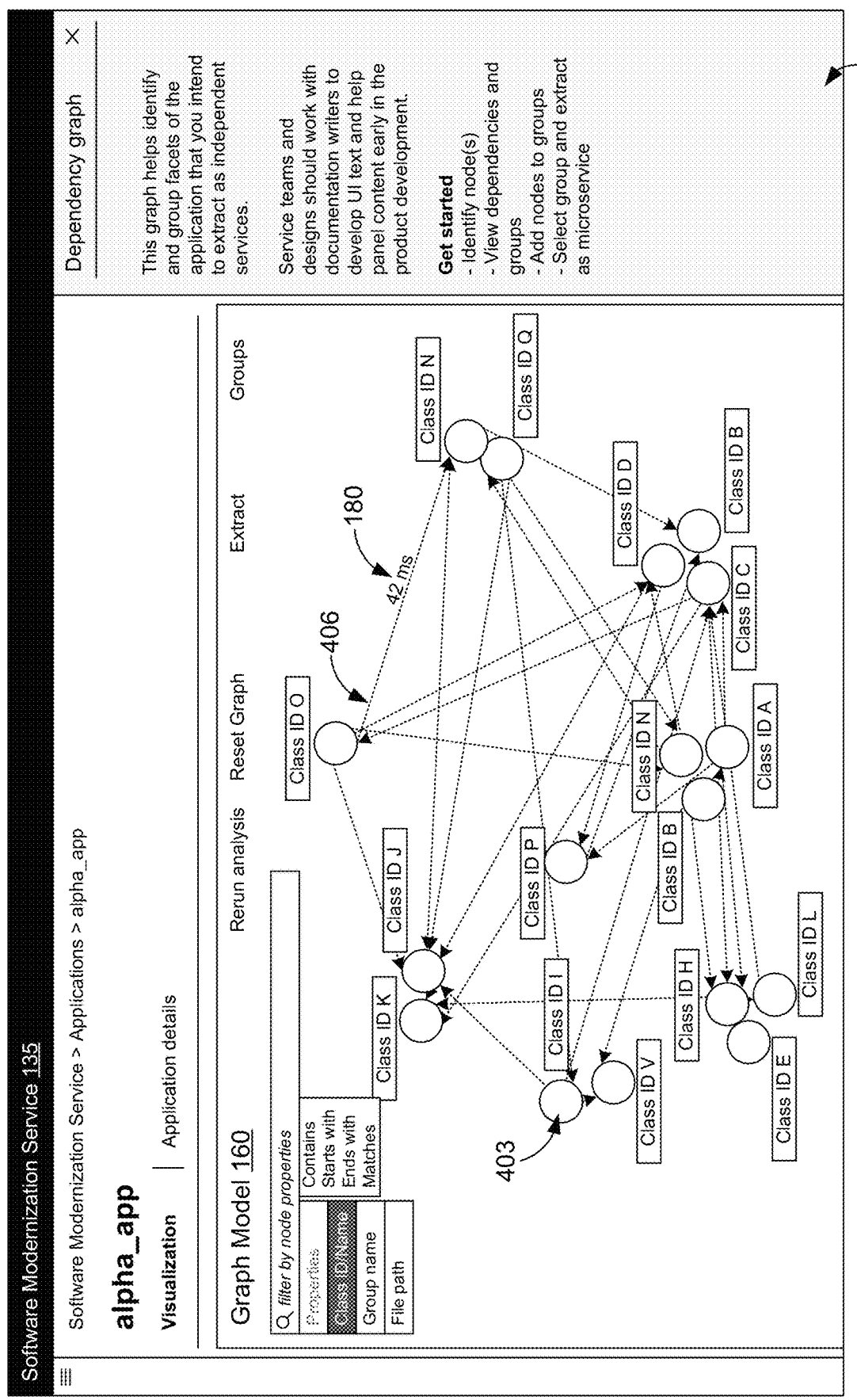

Moving along to FIG. 4, another non-limiting example of a user interface 203 generated by the software modernization service 135 is shown according to various embodiments. Specifically, a graphical representation or visualization of a graph model 160 is shown in the user interface 203 of FIG. 4. The graph model 160 includes a multitude of nodes 403 corresponding to application components of the monolithic computing application 124. For instance, each of the nodes 403 may correspond to one of a package, a class, a method, a data object, or other application component of the monolithic computing application 124. Each node 403 can be considered as an "island" that could be broken out as a discrete microservice, if the bridges to other components are addressed. The graph model 160 may be configured to be manipulated in the user interface 203, for instance, by a user of a client device 106, as will be described.

The graph model 160 also includes bridges 406 connecting at least a portion of the nodes 403 to other ones of the nodes 403 based on dependency relationships between the nodes 403. For instance, a bridge 406 connecting a node 403 to another node 403 indicates that the node calls or otherwise invokes the other node 403. The bridges 406 may be directional or bi-directional depending on a dependency relationship between nodes 403. For instance, if a first node 403 has a bridge (denoted by a forward arrow) connecting it to a second node 403, it is understood that an application component corresponding to the first node 403 calls an application component corresponding to the second node 403. In other words, the first node 403 is dependent on the second node 403. As such, a dependency relationship exists between the first node 403 and the second node 403, which is reflected in the graph model 160 shown in FIG. 4.

The graph model 160 may also include runtime metrics 180 which may be positioned proximate to a corresponding one of the nodes 403 or the bridges in 406 the graphical representation of the graph model 160. As but one example, the runtime metrics 180 may describe a time it takes for an application component corresponding to a node 403 to call another application component and receive a response. As such, the user can determine whether deploying an application component as a provider network service 109 may create a problematic delay or, alternatively, may speed up execution of a particular portion of the monolithic computing application 124.

In various embodiments, the software modernization service 135 may utilize a combination of source code 156 and/or bytecode 159 analysis and runtime metrics 180 to produce a visualization that shows dependency graphs, discovered API entry-points, runtime metrics 180 (e.g., runtime call counts), and static references between code artifacts (e.g., classes, methods, etc.). As may be appreciated, a user may use the visualization to understand dependencies between application components and determine components that are heavily called (e.g., from call count metrics). The software modernization service 135 may also present a list of candidate API endpoints that can be broken out and deployed separately based on annotations specific to the application framework (e.g., JAVA or ASP.NET).

The software modernization service 135 may help identify functionalities to decompose into microservices 121 by visualizing the internal components of a monolithic computing application 124. The user may define groups of nodes 403 and label multiple components to associate information about business domains. The visual representation of the graph model 160 of FIG. 4 shows common dependencies that require manual refactoring. It also shows any disconnected "islands" of functionality (e.g., based on dependencies between components) that can exist as independent services. In one example, a customer may carve out functionality for human resources, accounting, and supply Chain domains into microservices 121. The analysis produces lines to highlight couplings between components to be refactored. After the customer refactors code to remove a coupling, or a bridge 406, between the human resources and the accounting domains, the software modernization service 135 may re-run its analysis and produce updated information that identifies API endpoints to be carved out as separate services.

A service endpoint (also referred to as a network endpoint or just an "endpoint") represents an entry point for a service, such as a cloud service, third-party service running on cloud infrastructure (e.g., a customer's software application), or service running on infrastructure external to the cloud provider network (e.g., on-premise of a customer). A service endpoint can be the uniform resource locator (URL) of the service. Service endpoints enable programmatic connection to the service. As an example, services may offer a regional endpoint that can be used to make requests, which in some embodiments may follow the general syntax of protocol:// service-code.region-code.examplecloud.com. A virtual private cloud (VPC) endpoint can enable customers to privately connect their VPCs to supported cloud services without requiring an internet gateway, NAT device, VPN connection, or direct connection, such that traffic between that VPC and the service does not leave the private network backbone of the cloud provider network. A VPC endpoint may be considered as a service endpoint if it is used to access the application running in that VPC. Such endpoints can have a private IP address from the IP address range of the VPC or subnet.

In some embodiments, the user may configure the software modernization service 135 to exclude certain classes or packages from analysis. This may help a user to differentiate from false connections created by common libraries (e.g., common JAVA libraries). As such, the graph modeling service 150 may utilize various filtering techniques or routines, which a user can apply to remove unnecessary classes and/or packages from the visual representation of the graph model 160. Further, the user has the ability to upload a custom filter that includes a list of classes and packages to be excluded from the graph model 160 and/or the visual representation thereof.

In some embodiments, the software modernization service 135 may label bridges 406 of interest in the visualization that might be helpful when breaking up their application. For example, the labeled ones of the bridges 406 may represent the minimum cut that the software modernization service 135 has identified to make a certain group into its own bounded context. This may help users understand how to get the maximum value as fast as possible during their restructuring process.

Figure 5:
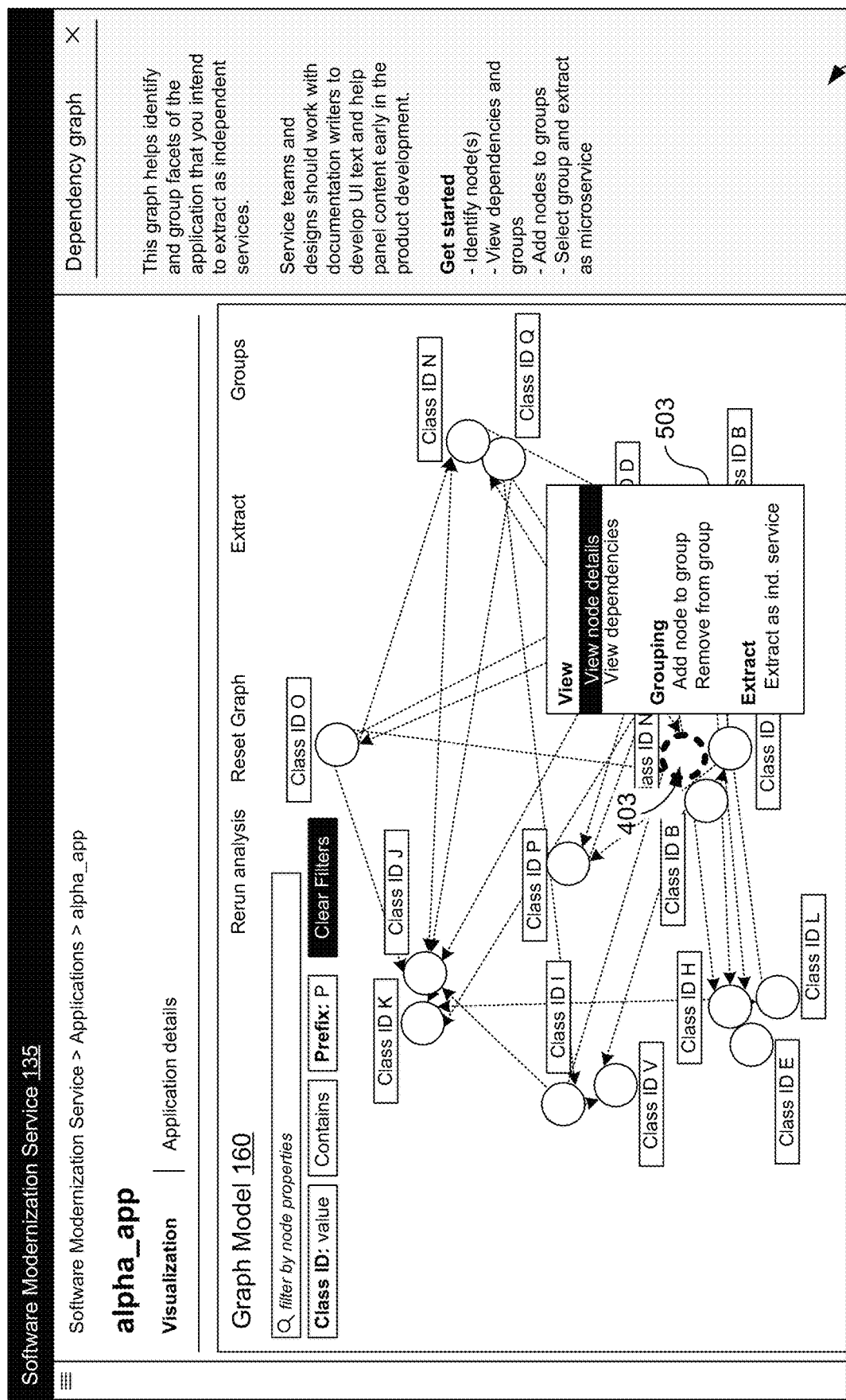

If a user selects or otherwise manipulates a node 403, a dialog region 503 may be presented in the user interface 203 proximate to the selected node 403, as shown in FIG. 5. The dialog region 503 may present various options that permit the user to identify more information regarding a node 403, such as the node details and the node dependencies. Additionally, the dialog region 503 permits the user to add the node 403 to a group, remove the node 403 from a group, and extract an application corresponding to the node 403 as an independent service (e.g., a microservice 121).

Figure 6:
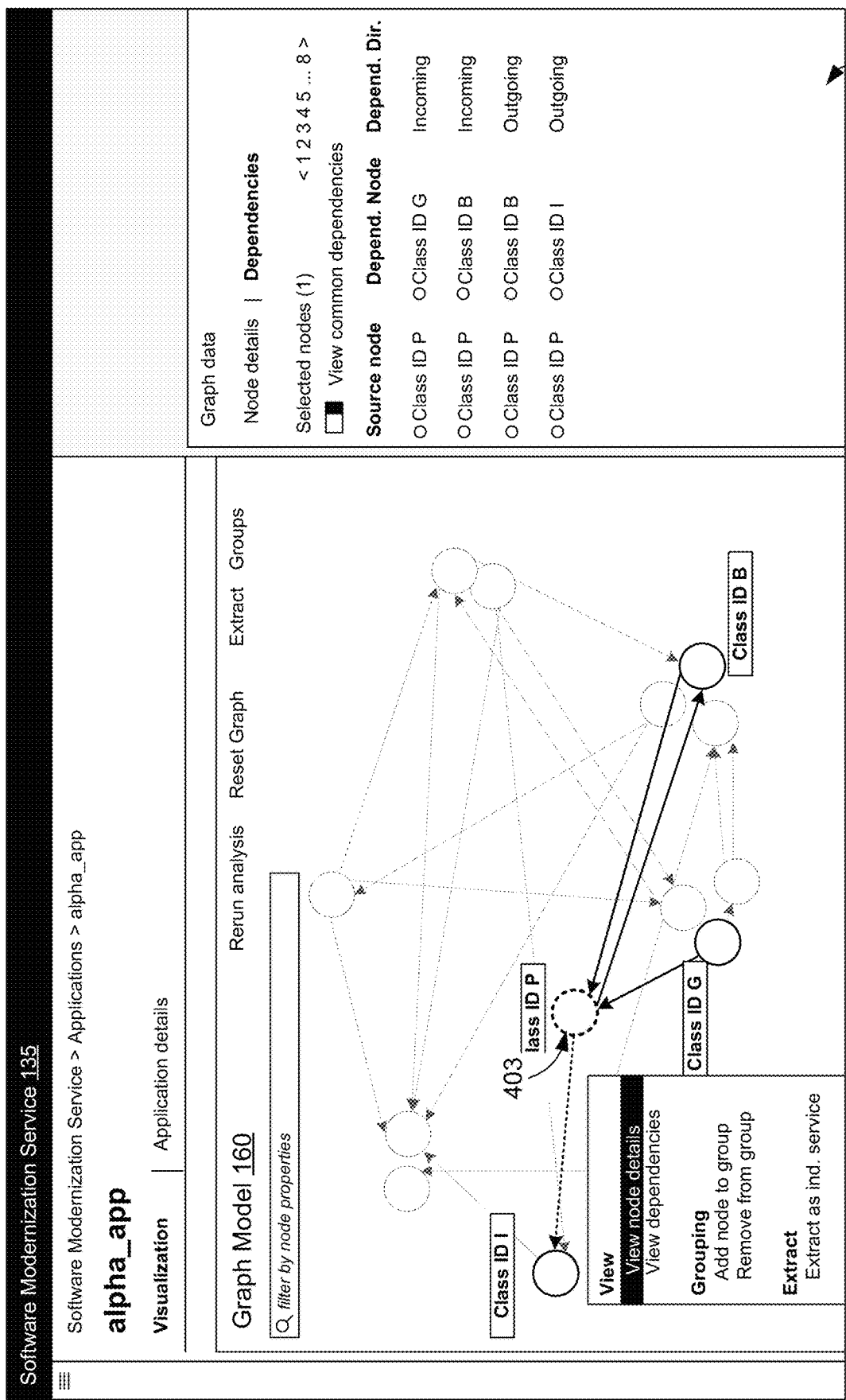

For instance, if the user selects the "View node details" option from the dialog region 503, the user interface 203 of FIG. 6 may be shown. The user interface 203 of FIG. 6 shows a list of nodes 403, the dependencies of each of the nodes 403, as well as a dependency direction that reflects whether an application component is invoking another application component (e.g., making an API call), or being invoked by another application component (e.g., responding to an API call).

As such, in various embodiments, the software modernization service 135 may identify a selection of two ones of the nodes 403 in the user interface 203 and identify common ones of the application components that are present in each of the two ones of the nodes 403. In response to the selection of the nodes 403, the software modernization service 135 may cause a display of the common ones of the application components in the user interface 203, as shown in FIG. 6.

In additional embodiments, the software modernization service 135 may identify a selection of two ones of the nodes 403 in the user interface 203 and identify a union of the application components that are present in each of the two ones of the nodes 403. In response to the selection of the nodes 403, the software modernization service 135 may cause a display of the union of the application components in the user interface 203.

In some embodiments, the graphical representation of the graph model 160 may include a first indicator (e.g., a label or an icon) positioned proximate to a first one of the bridges 406 identifying that the first one of the bridges 406 is capable of being removed automatically by the software modernization service 135. Further, the graphical representation of the graph model 160 may include a second indicator proximate to a second one of the bridges 406 identifying that the second one of the bridges 406 is only capable of being removed manually, for instance, by a user of the software modernization service 135. If the software modernization service 135 receives an indication that one or more of the bridges 406 has been removed manually, the software modernization service 135 may remove the bridges 406 from the graph model 160, as may be appreciated, and may cause a subsequent display of the user interface 203 comprising the graphical representation of the graph model 160 having the bridges 406 removed.

Figure 7:
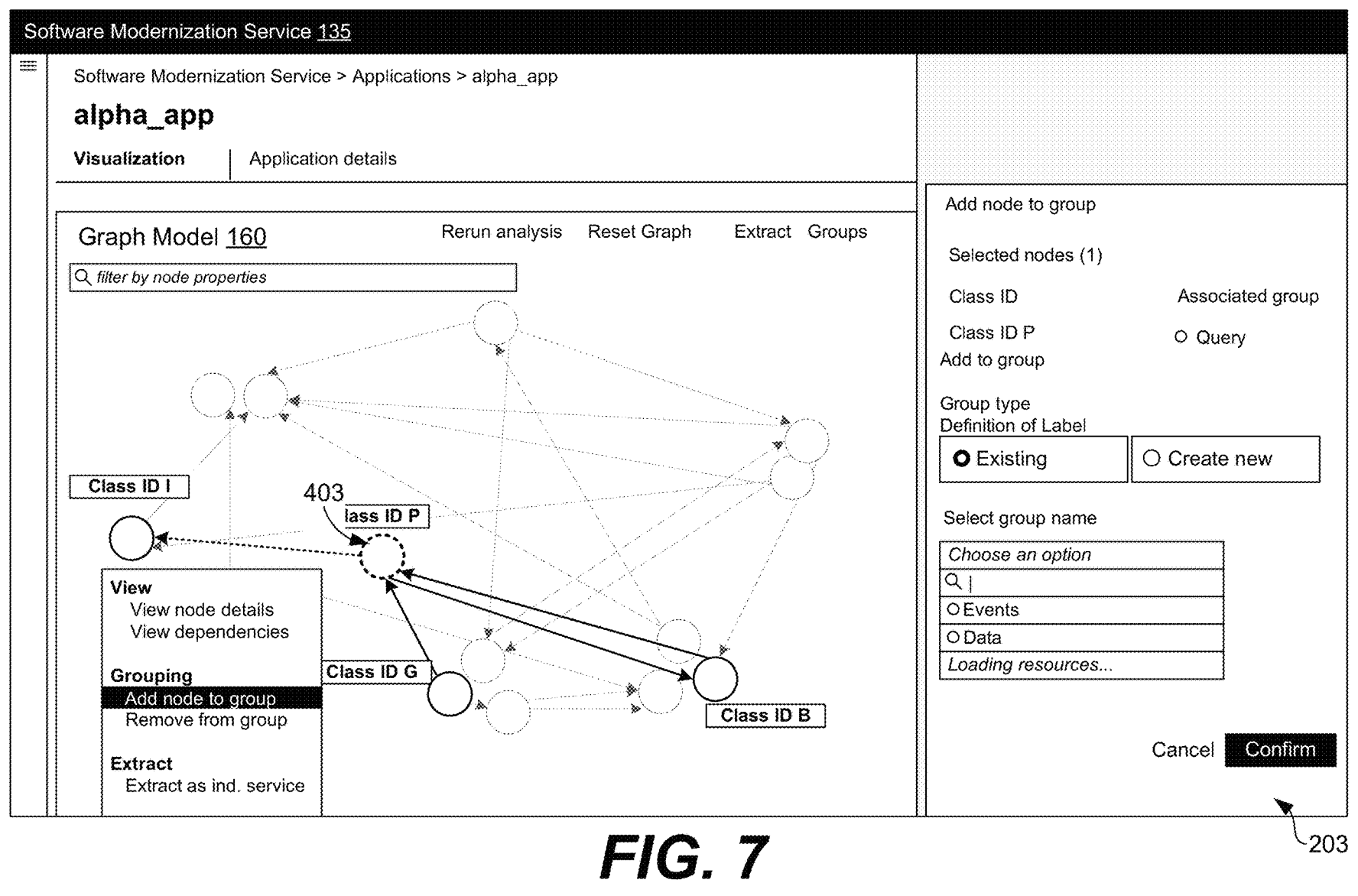

Moving along to FIG. 7, if the user selects the "Add node to group" option from the dialog region 503 of FIG. 5, the user interface 203 of FIG. 7 may be shown. As may be appreciated, the user likely desires to have control over which application components are extracted from the monolithic computing application 124. As such, the user may add particular nodes 403 to groups to extract a group of nodes 403 as opposed to an individual node. In some embodiments, nodes 403 can be grouped by business domains (e.g., HR, payroll, sales, accounting, etc.) or other desired category. As shown in FIG. 7, for a selected node 403, the node 403 can be added to an existing group or a new group can be created. As such, an application component corresponding to a node 403, or application components corresponding to a group of nodes, may be extracted as one or more microservices 121.

Figure 8:
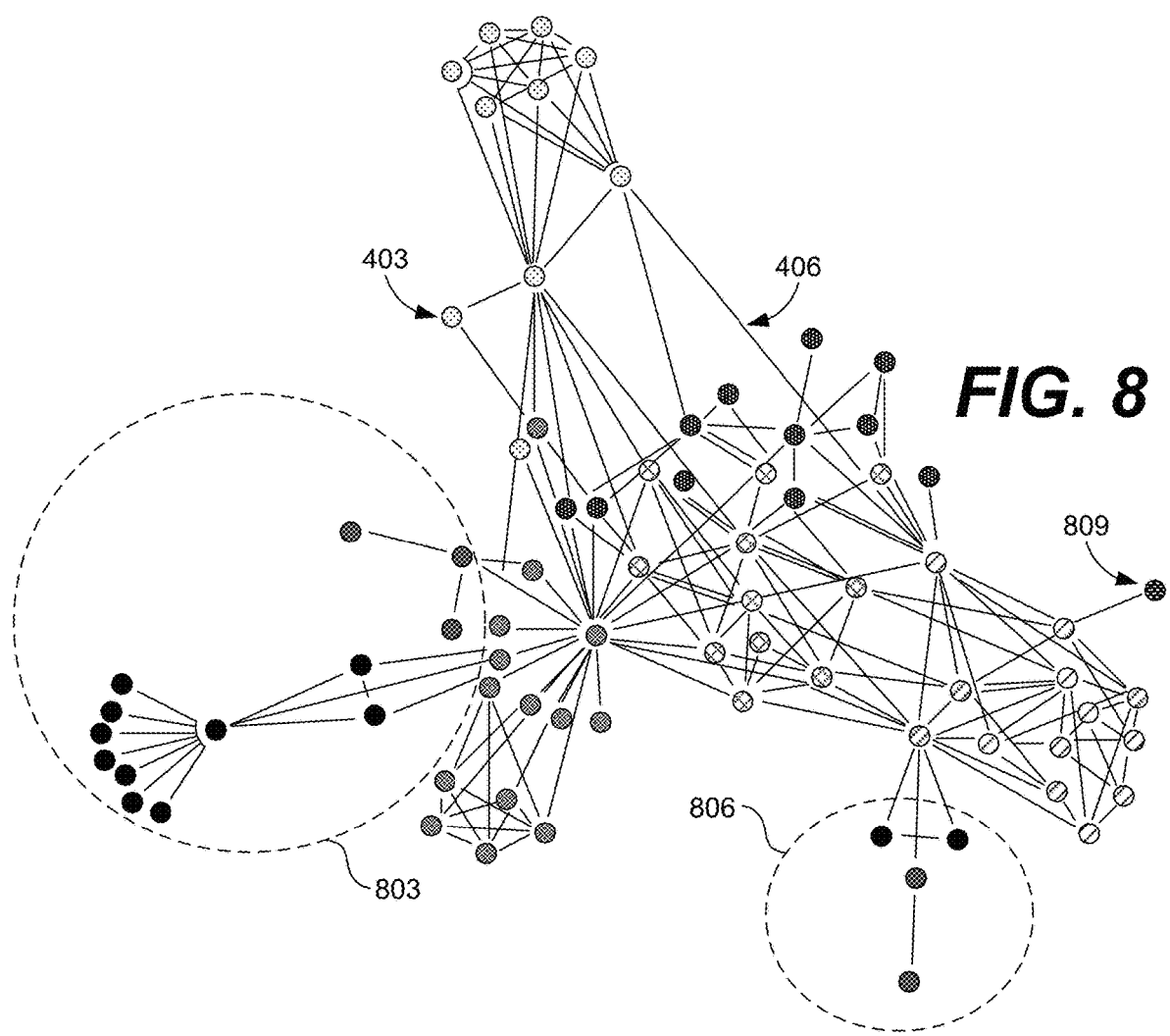
FIG. 8 is a graphical representation of an example graph model according to various embodiments of the present disclosure.

Another example of a graphical representation of a graph model 160 is shown in FIG. 8. Again, the graph model 160 includes nodes 403 and bridges 406. A first subset of the nodes 403 is organized into a first group 803, and a second subset of the nodes 403 is organized into a second group 806. The first group 803 and the second group 806 may be defined such that the application components corresponding to the nodes 403 in the first group 803 are extracted as a first independently deployable component (e.g., a first microservice 121), and the application components corresponding to the nodes 403 in the second group 803 are extracted as a second independently deployable component (e.g., a second microservice 121). Additionally, an isolated node 809 is shown as having only one bridge 406 or, in other words, only a single dependency.

In some situations, the graph model 160 may include two isolated nodes 809 that are visible; however, there may be one or more bridges 406 connecting the two isolated nodes 809. The bridges 406 represent the overlap of dependencies, and the user may be prompted to take one or more actions (e.g., manual editing or refactoring of the source code 156) to break them apart to create two isolated nodes 809 having no bridges 406 connecting therebetween.

Figure 9:
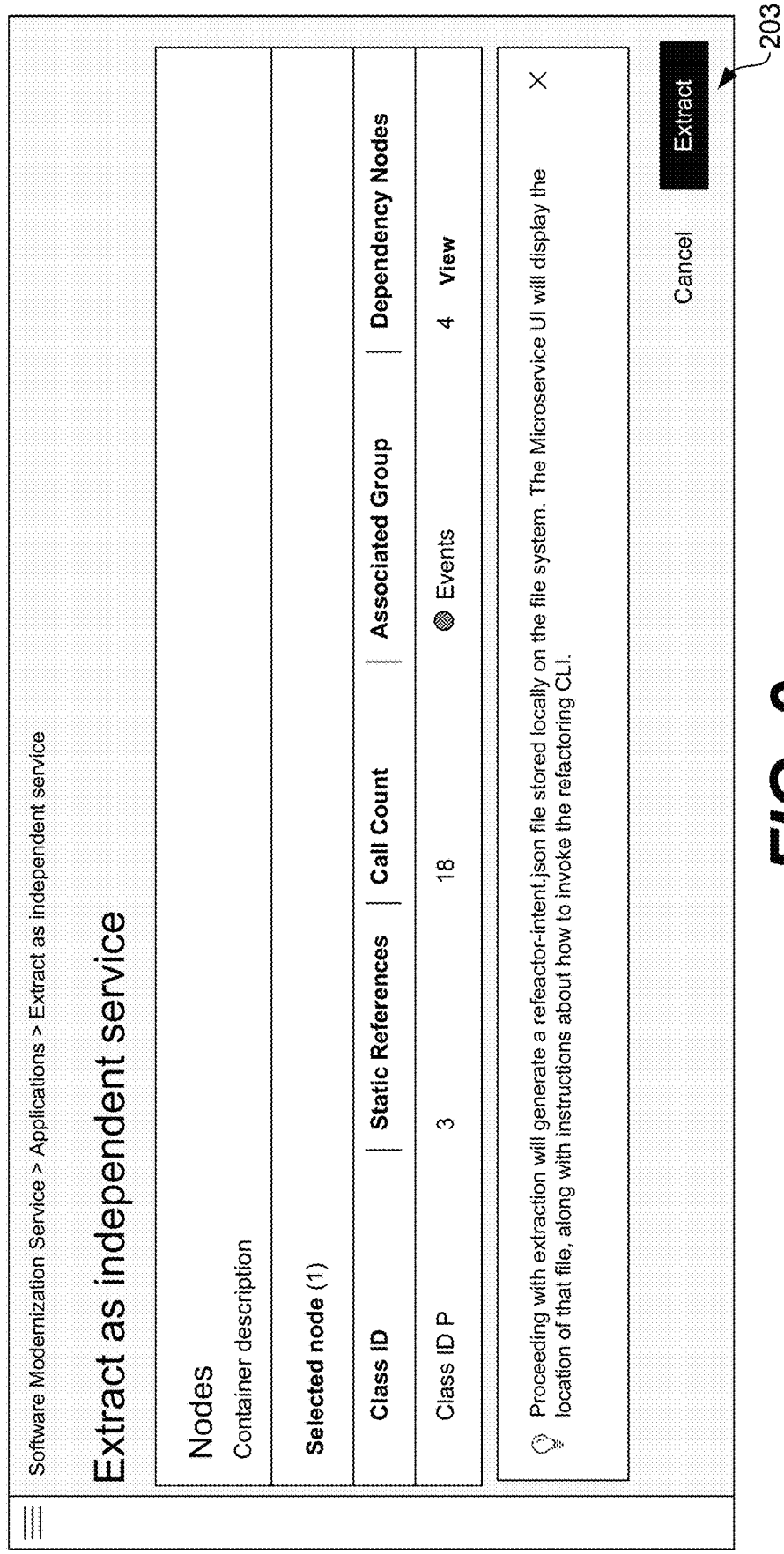
FIG. 9 is a drawing of a user interface served up by the networked environment of FIG. 1 according to various embodiments of the present disclosure.

Moving along to FIG. 9, an example of a user interface 203 is shown for extracting an application component of a node 403 from the monolithic computing application 124 as an independent service (e.g., a microservice 121). In some examples, the user interface 203 of FIG. 9 may be shown when the "Extract as independent service" option is selected from the dialog region 503 shown in FIG. 5.

The user interface 203 of FIG. 9 shows a unique identifier for the node 403, a number of static references (e.g., static dependencies), a number of times the node 403 is called during execution, a group identifier, and a number of dependent nodes. It is understood that, when the application component is extracted, required dependencies are also extracted such that the application component is independently deployable or, in other words, independently executable. While the user interface 203 of FIG. 9 shows an example extraction of a single node or, in other words, an extraction of a single application component, it is understood that the user interface 203 may assist with extraction of multiple nodes. In other words, the user interface 203 may be employed to extract multiple application components as a single deployable component.

Referring next to FIGS. 10-12, example source code 156 of an application component is shown in accordance with various embodiments. Specifically, FIG. 10 shows source code 156 of an application component prior to extraction or modification, FIG. 11 shows functionality extracted from the source code 156 of FIG. 10, and FIG. 12 shows a refactored version of the original application.

A user may select an API entry point to deploy as a separate service (e.g., a microservice 121) if its functionality is an independent "island" in the visual representation of the graph model 160 within a bounded context. The software modernization service 135 may carve out functionality for the entry-point as an independent package, including its dependencies (e.g., library files, jar package files, and DLL files). The software modernization service 135 may replace local calls to the extracted service with network calls (by creating a different implementation of the classes making the calls while preserving the interface).

Further, the software modernization service 135 may place an extracted service in separate code repositories that teams can develop, build, and deploy independently. When local calls are converted to network calls, new code is generated in a forked repository without altering the original. While using the software modernization service 135 to convert local calls to network calls, a user may be mindful of network latency, network reachability, networking related charges, payload size limits, and reliability implications for communication with extracted services. The code sample shown in FIGS. 10-13 carve out an API endpoint into a separate microservice 121.

After manually removing dependencies to prepare isolated nodes 809 of the monolith computing application 124 for extraction, the software modernization service 135 may programmatically extract API endpoints as separate microservices 121. To do so, the software modernization service 135 may extract underlying source code of the API endpoints by replacing local calls with network calls and creating a different implementation of the calling class while preserving the interface in new code repositories with or without altering the original. The software modernization service 135 can "break" some bridges between islands programmatically by making a local call accessible as a network endpoint and automatically inserting code into other portions of the application to call that endpoint. For example, the software modernization service 135 can figure out a method that should be exposed via an API, automatically put network accessibility scaffolding around the method, and then replace other portions of the application that would call the class with a call to the API endpoint. Accordingly, the software modernization service 135 can deploy these repositories independently as microservices 121.

The example shown in FIGS. 10-12 shows an example of the software modernization service 135 extracting highlighted API endpoints 903a . . . 903e into a separate service, such as a microservice 121. Specifically, a public class LoanComputation is shown which invokes two classes, IndependentClass1 and IndependentClass2, during its MainMethod( ) routine.

FIG. 11 shows a modified form of the code after being transformed to execute on one of the provider network services 109, thereby executing as a microservice 121 that can be accessed using a network-based API. For instance, the source code of FIG. 11 may be executed by a container service 118a, an on-demand code execution service 118b, an elastic computing service 118c, or other suitable service.

After creating the microservice 121, the monolithic computing application 124 may be modified to invoke the microservice 121 as opposed to the prior existing code. For instance, as shown in FIG. 12, the local call to the MainMethod( ) routine has been replaced with a network-based API call to the microservice 121 having the equivalent functionality of the MainMethod( ) routine.

Figure 13:
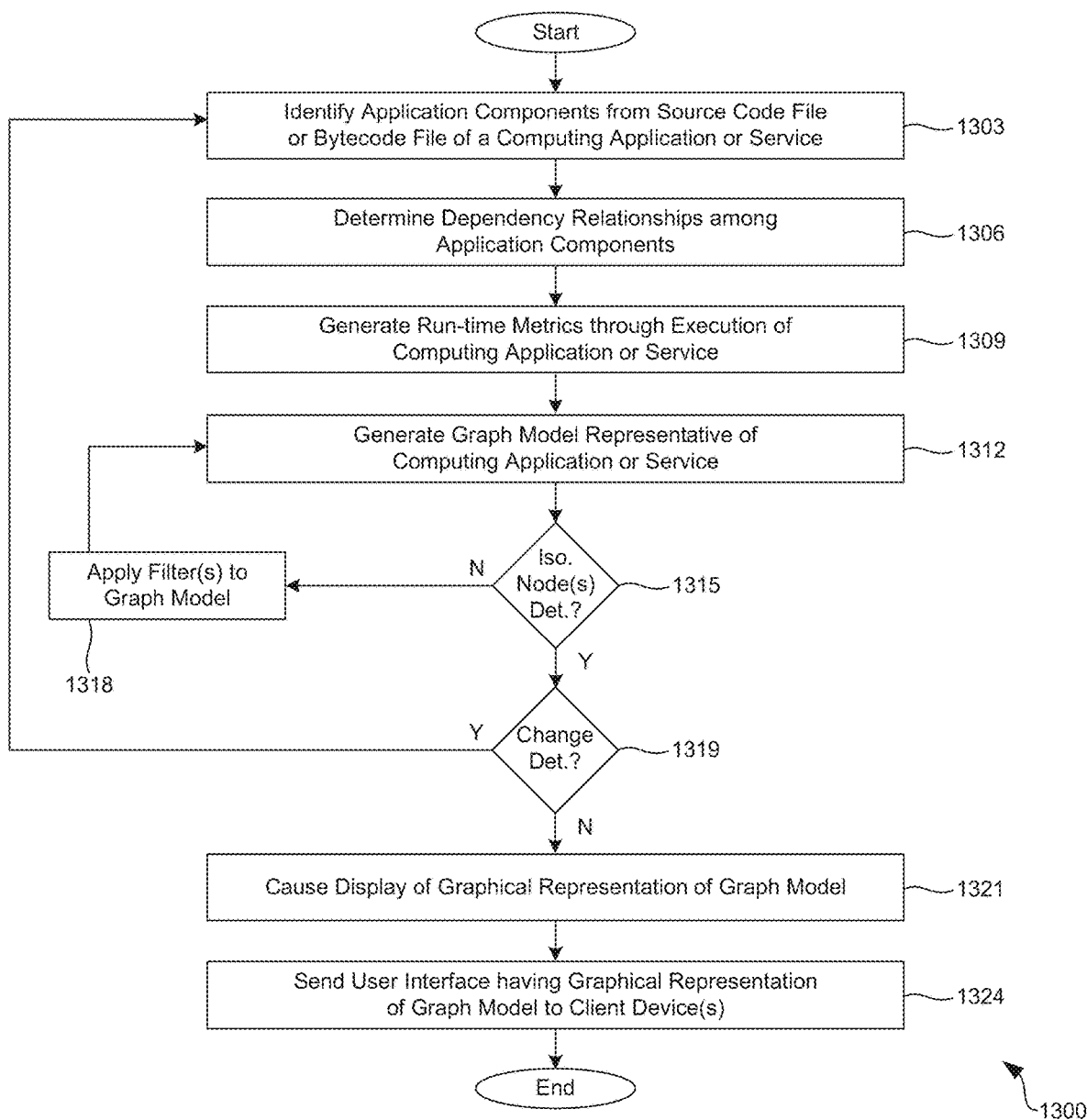
FIGS. 13-15 are flowcharts illustrating example operations of a software modernization service executed in a computing environment in the networked environment of FIG. 1 according to various embodiments of the present disclosure.

Turning now to FIG. 13, a flowchart 1300 is shown that provides one example of the operation of a portion of the software modernization service 135 according to various embodiments. It is understood that the flowchart of FIG. 13 provides merely an example of the many different types of functional arrangements that may be employed to implement the operation of the portion of the software modernization service 135 as described herein. As an alternative, the flowchart of FIG. 13 may be viewed as depicting an example of elements of a method implemented in the computing environment 103 or the client device 106 according to one or more embodiments.

Beginning with 1303, the software modernization service 135 may identify application components from a source code file or a bytecode file of a computing application or service. The application components may include one or more a package, a class, a method, a data object, a routine, a code block, or the like. The computing application may include a monolithic computing application 124, as may be appreciated.

Next, at 1306, the software modernization service 135 may determine dependency relationships among the application components identified in 1303. Generally, dependency relationships may indicate whether an application component is dependent on another application component, or vice versa. As such, a dependency relationship for a given application component may include, for example, various applications components invoked by the given application component (e.g., making a request), or various application components that invoke the given application component (e.g., responding to a request). The dependency relationships may include static dependencies and/or dynamic (or runtime) dependencies, as may be appreciated. Static dependencies indicate dependencies that may be identified upon an inspection of the source code 156 or the bytecode 159, whereas runtime dependencies are identifiably only at runtime of the monolithic computing application 124.

In 1309, the software modernization service 135 may generate runtime metrics 180 for the computing application. In some embodiments, generating the runtime metrics 180 may include executing an application binary of the computing application using test data. As such, the runtime metrics 180 may include, for example, a response time when invoking an application component, a number of times a respective application component is invoked, a number of static dependencies of an application component, a number of runtime dependencies of an application component, a number of data stores 130 or databases accessed, a number of queries to the data stores 130 or the databases per unit of time, a frequency of invoking an application component, central processing unit (CPU) usage per unit of time, memory usage per unit of time, bandwidth, as well as other runtime metrics 180 as may be appreciated.

Moving along, in 1312, the software modernization service 135 may generate a graph model 160 that is representative of the computing application or service. The graph model 160 may include a data object according to various embodiments. In some embodiments, the graph model 160 includes a hierarchical data object, such as an XML data object, a JSON data object, or other suitable data object.

The graph model 160 includes nodes 403 corresponding to the application components identified in 1303. Further, the graph model 160 includes bridges 406 (also referred to as edges) that connect nodes 403 to one another, representing the dependency relationship between two or more nodes 403. In some embodiments, the bridges 406 are directional or bi-directional to better illustrate the dependency between two or more application components.

Next, in 1315, the software modernization service 135 may determine whether an isolated node 809 has been detected in the graph model 160. An isolated node 809 may be a potential candidate for extraction as it has few or no dependencies with respect to other nodes 403. As such, the threshold number of bridges 406 may include one, two, or three bridges 406 in some examples, although other threshold number of bridges 406 may be employed. In some embodiments, the graph model 160 is generated such that at least one of the nodes 403 is an isolated node 809 having less than a threshold number of bridges 406 connecting to other ones of the nodes 403. For instance, a filter may be applied to the graph model 160, or a graphical representation thereof, to remove bridges 406 between nodes 403.

If an isolated node 809 was not detected in 1315, the process may proceed to 1318. In 1318, the software modernization service 135 may apply additional filters to the graph model 160 in attempt to identify an isolated node 809. As such, the process reverts to 1312 to continue generating the graph model 160 until an isolated node 809 is detected. In other words, the software modernization service 135 may generate a first iteration of the graph model 160, determine that an isolated node 809 is not present in the first iteration of the graph model 160, and continue applying filters to the graph model 160 to generate subsequent iterations of the graph model 160 until an isolated node 809 is detected. Additionally or alternatively, if an isolated node 809 is not detected, the software modernization service 135 may recommend one or more bridges 406 for the user to manually remove from the monolithic computing application 124 to facilitate identification of an isolated node 809.

Referring back to 1315, if an isolated node 809 has been detected, the process may proceed to 1319. In 1319, the software modernization service 135 may determine whether a change has been detected in association with one or more of the application components. For instance, the graph model 160 may be used to identify bridges 406 between nodes 403 that may be automatically broken by the software modernization service 135, or must be manually broken. In the event a bridge 406 (e.g., a call to another application component) is manually removed, the change may be detected by the software modernization service 135, and the process may revert to 1303.

Otherwise, if no changes are detected in 1319, the process may proceed to 1321. In 1321, the software modernization service 135 may cause a display of a graphical representation of the graph model 160, which may include, in 1324, generating and sending one or more user interfaces 203 having the graphical representation of the graph model 160 to a client device 106 for display. Thereafter, the process may proceed to completion.

Figure 14:
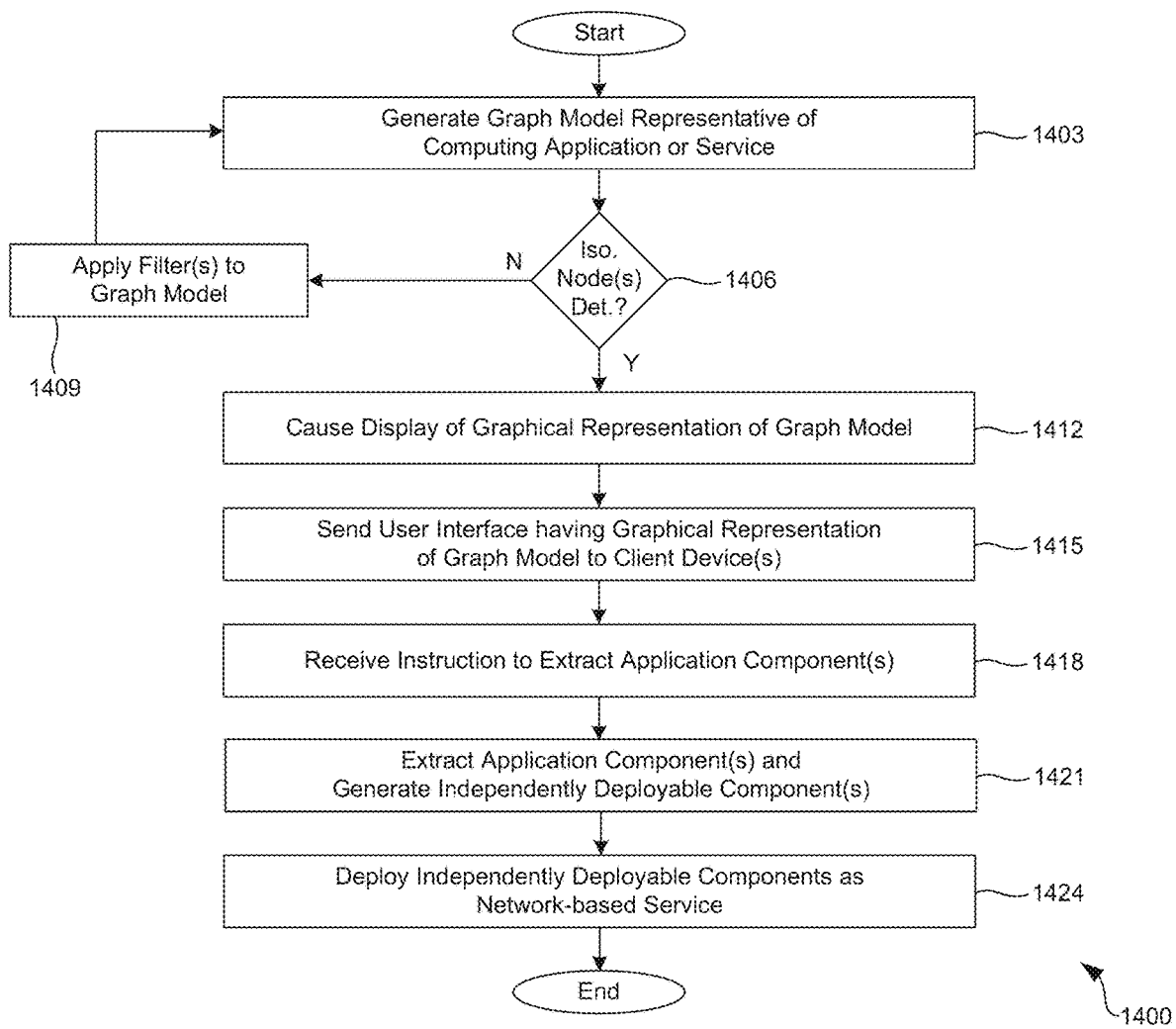

Moving on to FIG. 14, a flowchart 1400 is shown that provides one example of the operation of a portion of the software modernization service 135 according to various embodiments. It is understood that the flowchart of FIG. 14 provides merely an example of the many different types of functional arrangements that may be employed to implement the operation of the portion of the software modernization service 135 as described herein. As an alternative, the flowchart of FIG. 14 may be viewed as depicting an example of elements of a method implemented in the computing environment 103 or the client device 106 according to one or more embodiments.

Beginning with 1403, the software modernization service 135 may generate a graph model 160 that is representative of the computing application or service, where the graph model 160 includes nodes 403 and bridges 406 that connect nodes 403 to one another.

Next, in 1406, the software modernization service 135 may determine whether an isolated node 809 has been detected in the graph model 160. An isolated node 809 may be a potential candidate for extraction as it has few or no dependencies with respect to other nodes 403. In some embodiments, the graph model 160 is generated such that at least one of the nodes 403 is an isolated node 809 having less than a threshold number of bridges 406 connecting to other ones of the nodes 403. For instance, a filter may be applied to the graph model 160, or a graphical representation thereof, to remove bridges 406 between nodes 403.

If an isolated node 809 was not detected in 1406, the process may proceed to 1409. In 1409, the software modernization service 135 may apply additional filters to the graph model 160 in attempt to identify an isolated node 809. As such, the process reverts to 1403 to continue generating the graph model 160 until an isolated node 809 is detected. Additionally or alternatively, if an isolated node 809 is not detected, the software modernization service 135 may recommend one or more bridges 406 for the user to manually remove from the monolithic computing application 124 to facilitate identification of an isolated node 809.

Referring back to 1406, if an isolated node 809 has been detected, the process may proceed to 1412. In 1412, the software modernization service 135 may cause a display of a graphical representation of the graph model 160, which may include, in 1415, generating and sending one or more user interfaces 203 having the graphical representation of the graph model 160 to a client device 106 for display.

Next, in 1418, the software modernization service 135 may receive an instruction to extract an application component. For instance, a user may select a node 403 from the graphical representation of the graph model 160, and may select the "Extract as independent service" from the dialog region 503 of the user interface 203 of FIG. 5. The user may then be directed to the user interface 203 of FIG. 9, where the user may confirm to extract an application component or a plurality of application components as an independent service.

In 1421, the software modernization service 135 may extract an application component corresponding to the selected node 403 and may generate an independently deployable component. Thereafter, in 1424, the independently deployable application component may be deployed as a network-based service. In one example, source code 156 of a monolithic computing application 124 may be accessed and modified to execute in one of the provider network services 109. In some embodiments, the source code 156 may be translated from a first coding language (e.g., ASP-.NET) to a second coding language (e.g., Python©) prior to deployment dependency on compliance criteria associated with one or more of the provider network services 109.

Next, the software modernization service 135 may create necessary resources needed to execute the extracted application component in one or more of the provider network services 109. For instance, if the user desires to execute the extracted application component using an on-demand code execution service 118b, the software modernization service 135 may associate a user account of the user with a new function, and store the code to be executed in the function.

In another example, if the user desires to execute the extracted application component using a container service 118a, the software modernization service 135 may create a new container associated with the user account and store the code in the new container for execution. It is understood that, when the extracted application component is deployed on a provider network service 109, the extracted application component is accessible through a network-based API call or other suitable call, as may be appreciated. Thereafter, the process may proceed to completion.

Figure 15:
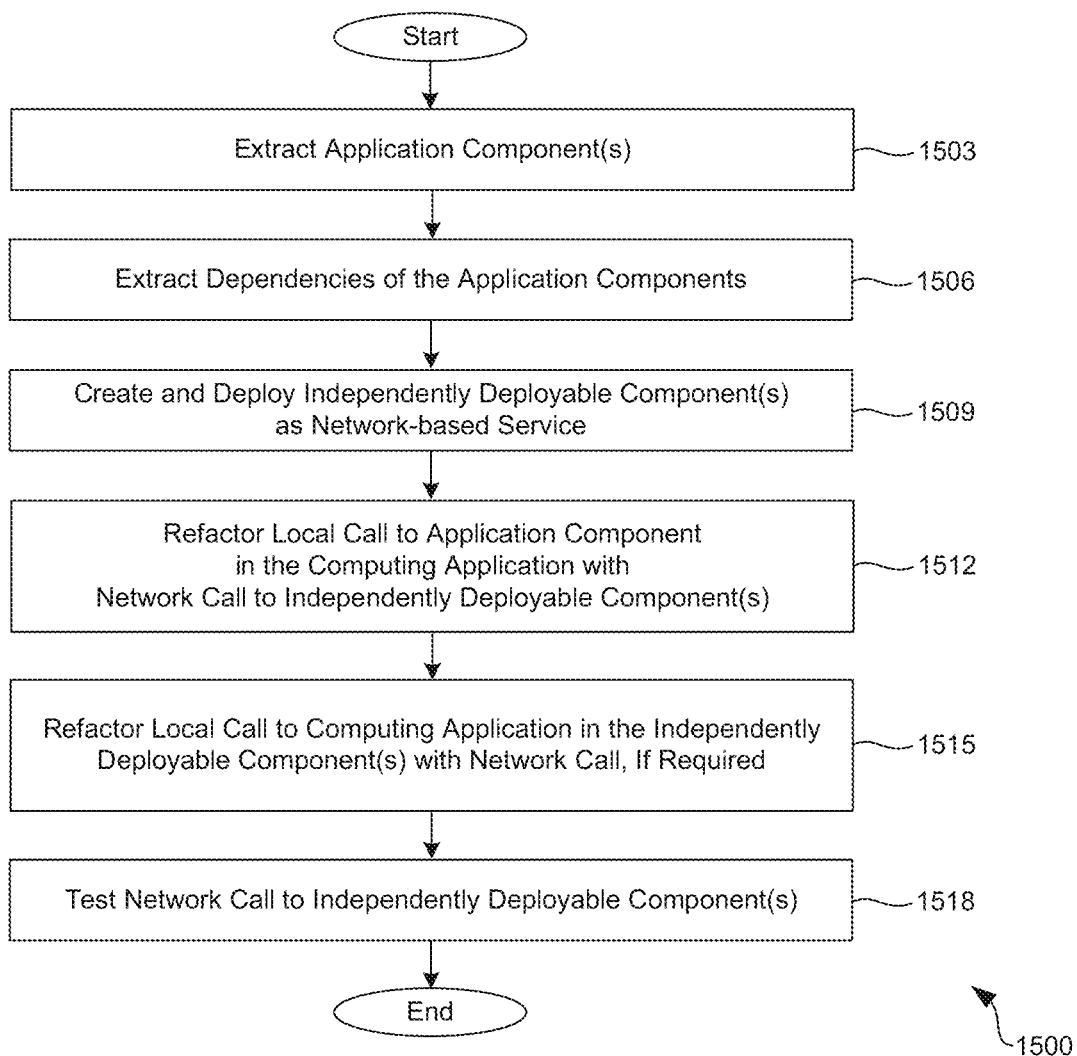

Moving on to FIG. 15, a flowchart 1500 is shown that provides one example of the operation of a portion of the software modernization service 135 according to various embodiments. It is understood that the flowchart of FIG. 15 provides merely an example of the many different types of functional arrangements that may be employed to implement the operation of the portion of the software modernization service 135 as described herein. As an alternative, the flowchart of FIG. 15 may be viewed as depicting an example of elements of a method implemented in the computing environment 103 or the client device 106 according to one or more embodiments.

Beginning with 1503, the software modernization service 135 may extract an application component corresponding to the selected node 403. Additionally, in 1506, the software modernization service 135 may identify dependencies of the selected node 403 and extract those dependencies as well, if any. For instance, an application component may rely on a graphics library. It is understood that the software modernization service 135 will extract the application component that invokes the graphics library, as well as the graphics library itself. The dependencies extracted may include classes, JAR files, DLL files, other application components, etc.

Thereafter, in 1509, the independently deployable application component may be deployed as a network-based service. For instance, the source code 156 of a monolithic computing application 124 may be accessed and modified to execute in one of the provider network services 109. In some embodiments, the software modernization service 135 may create a new application package (e.g., a JAVA® package file or JAR file) representing the isolated node 809 that can be independently deployed from the rest of the monolithic computing application 124.

In other words, the software modernization service 135 may create an independently deployable subunit (e.g., an independently deployable microservice 121) from the computing application, the independently deployable subunit comprising the application component as extracted, where the application component has a network endpoint.

In 1512, the software modernization service 135 may programmatically refactor a local call to the extracted application component with a network call to the independently deployable component, now deployed as a provider network service 109 and/or a microservice 121. In some examples, the software modernization service 135 may execute a find and replace routine to replace a local call to a MainMethod ( ) with a network-based API call (e.g., HttpAPIInvoker ( ).invoke("https://execute-api/MainMethod");), as shown in the source code 156 of FIG. 12.

In other words, when a local application component is extracted into a separate microservice 121, the software modernization service 135 may automatically make that application component available as a network endpoint. Further, the software modernization service 135 may automatically write code into other portions of the monolithic computing application 124 to call that endpoint over a network. In some embodiments, the software modernization service 135 may determine a class or method to be removed from the monolithic computing application 124, and may create network accessibility code around a call to the class or method (e.g., invoking an HttpAPIInvoke( ) data object). Thereafter, the software modernization service 135 may replace calls to the class or method with a call to the network API endpoint in the remainder of the monolithic computing application 124.

Similarly, in 1515, the software modernization service 135 may refactor a local call to the computing application in the independently deployable component with a network call to the computing application, such as the monolithic computing application 124, if needed. As may be appreciated, in some situations, application components may include two-way or bilateral communication. As such, as the independently deployable component is to be deployed as a provider network service 109 and/or a microservice 121, the local call to the computing application may be replaced with a network call to the computing application. It is understood that if bilateral communication is not performed between the extracted application component and application components of the monolithic computing application 124, the process described in 1515 may not be required.

Finally, in 1518, the software modernization service 135 may test the network call to the independently deployable component to verify operation. In some embodiments, the software modernization service 135 may use test data on the application component prior to extraction and after extraction, and compare the results to verify operation of the extracted application component. Thereafter, the process may proceed to completion.

Figure 16:
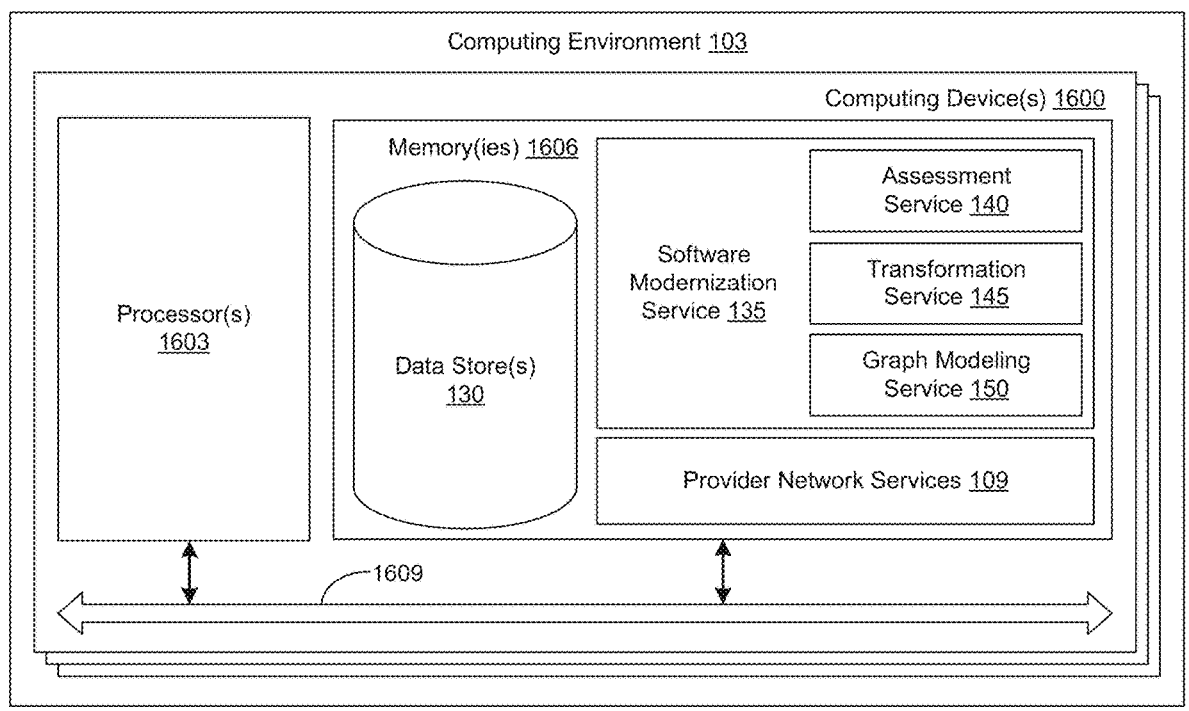
FIG. 16 is a schematic block diagram that provides one example illustration of a computing environment employed in the networked environment of FIG. 1 according to various embodiments of the present disclosure.

With reference to FIG. 16, shown is a schematic block diagram of the computing environment 103 according to an embodiment of the present disclosure. The computing environment 103 includes one or more computing devices 1600. Each computing device 1600 includes at least one processor circuit, for example, having a processor 1603 and a memory 1606, both of which are coupled to a local interface 1609. The processor 1603 may include a hardware processor, as may be appreciated. To this end, each computing device 1600 may comprise, for example, at least one server computer or like device. The local interface 1609 may comprise, for example, a data bus with an accompanying address/control bus or other bus structure as can be appreciated.

Stored in the memory 1606 are both data and several components that are executable by the processor 1603. In particular, stored in the memory 1606 and executable by the processor 1603 are the software modernization service 135, the assessment service, the transformation service 145, the graph modeling service 150, and potentially other applications. Also stored in the memory 1606 may be a data store 130 and other data. In addition, an operating system may be stored in the memory 1606 and executable by the processor 1603.

It is understood that there may be other applications that are stored in the memory 1606 and are executable by the processor 1603 as can be appreciated. Where any component discussed herein is implemented in the form of software, any one of a number of programming languages may be employed such as, for example, C, C++, C#, Objective C, Java®, JavaScript®, Perl, PHP, Visual Basic©, Python®, Ruby, Flash®, or other programming languages.

A number of software components are stored in the memory 1606 and are executable by the processor 1603. In this respect, the term "executable" may refer to a program file that is in a form that can ultimately be run by the processor 1603. Examples of executable programs may be, for example, a compiled program that can be translated into machine code in a format that can be loaded into a random access portion of the memory 1606 and run by the processor 1603, source code that may be expressed in proper format such as object code that is capable of being loaded into a random access portion of the memory 1606 and executed by the processor 1603, or source code that may be interpreted by another executable program to generate instructions in a random access portion of the memory 1606 to be executed by the processor 1603, etc. An executable program may be stored in any portion or component of the memory 1606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1606 is defined herein as including both volatile and nonvolatile memory and data storage components. Volatile components are those that do not retain data values upon loss of power. Nonvolatile components are those that retain data upon a loss of power. Thus, the memory 1606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1603 may represent multiple processors 1603 and/or multiple processor cores and the memory 1606 may represent multiple memories 1606 that operate in parallel processing circuits, respectively. In such a case, the local interface 1609 may be an appropriate network that facilitates communication between any two of the multiple processors 1603, between any processor 1603 and any of the memories 1606, or between any two of the memories 1606, etc. The local interface 1609 may comprise additional systems designed to coordinate this communication, including, for example, performing load balancing. The processor 1603 may be of electrical or of some other available construction.

Although the software modernization service 135, the assessment service, the transformation service 145, the graph modeling service 150, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 13-15 show the functionality and operation of an implementation of portions of the computing environment. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1603 in a computer system or other system. The machine code may be converted from the source code, etc. If embodied in hardware, each block may represent a circuit or a number of interconnected circuits to implement the specified logical function(s).

Although the flowcharts of FIGS. 13-15 show a specific order of execution, it is understood that the order of execution may differ from that which is depicted. For example, the order of execution of two or more blocks may be scrambled relative to the order shown. Also, two or more blocks shown in succession in FIGS. 3-8 may be executed concurrently or with partial concurrence. Further, in some embodiments, one or more of the blocks shown in FIGS. 13-15 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the software modernization service 135, the assessment service, the transformation service 145, and the graph modeling service 150, that comprises software or code can be embodied in any non-transitory computer-readable medium for use by or in connection with an instruction execution system such as, for example, a processor 1603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the software modernization service 135, the assessment service, the transformation service 145, and the graph modeling service 150, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1600, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device comprising memory and a processor;
    a modernization service stored in the memory and executable in the at least one computing device that when executed, directs the at least one computing device to:
        identify first and second application components based on analysis of a monolithic computing application, wherein the first and second application components represent different portions of the monolithic computing application;
        generate a graph model comprising a plurality of nodes and a plurality of bridges connecting at least a portion of the nodes to other ones of the nodes, wherein individual ones of the nodes correspond to the first and second application components, and a respective one of the nodes is identified as being independently deployable based at least in part on a number of bridges connected to the respective one of the nodes being below a predetermined threshold;
        identify a respective bridge connecting the first and second application components, wherein the respective bridge represents a local call from the first application component to a process of the second application component;
        programmatically refactor the local call into a network call from the first application component to the process of the second application component by:
            making the process accessible via a network endpoint in the second application component, and
            replacing the local call in the first application component with a call to the network endpoint;
        create a first microservice from the monolithic computing application, the first microservice comprising the first application component having the call to the network endpoint; and
        create a second microservice from the monolithic computing application, the second microservice comprising the second application component having the network endpoint; and
    a program execution service executable in the at least one computing device configured to deploy the first and second microservices such that the process is accessible to the first application component via the network endpoint.

2. The system of claim 1, wherein replacing the local call in the first application component with the call to the network endpoint comprises performing a find and replace routine in source code or bytecode of the monolithic computing application.

3. The system of claim 1, wherein making the process accessible via the network endpoint in the second application component comprises:
    identify the local call as the call to a class or a method; and
    modify source code or bytecode of the monolithic computing application to create network accessibility code around the call to the class or method.

4. A computer-implemented method, comprising:
    identifying first and second application components based on analysis of a computing application, wherein the first and second application components represent different portions of the computing application;
    generating a graph model comprising a plurality of nodes and a plurality of bridges connecting at least a portion of the nodes to other ones of the nodes, wherein individual ones of the nodes correspond to the first and second application components, and a respective one of the nodes is identified as being independently deployable based at least in part on a number of bridges connected to the respective one of the nodes being below a predetermined threshold;
    identifying a local call from the first application component to a process of the second application component;
    creating an independently deployable subunit from the computing application, the independently deployable subunit comprising the second application component having a network endpoint;
    deploying the independently deployable subunit such that the process is accessible to the first application component via the network endpoint; and
    programmatically refactoring the local call into a network call from the first application component to the process of the second application component.

5. The computer-implemented method of claim 4, wherein the independently deployable subunit is a microservice executed remotely from an execution environment of the computing application.

6. The computer-implemented method of claim 4, wherein programmatically refactoring the local call comprises:
    making the process accessible via the network endpoint in the second application component, and
    replacing the local call in the first application component with a call to the network endpoint.

7. The computer-implemented method of claim 4, further comprising deploying the independently deployable subunit such that the process is accessible to the first application component via the network endpoint.

8. The computer-implemented method of claim 4, wherein creating the independently deployable subunit further comprises:
    identifying a plurality of dependency relationships for the second application component; and creating the independently deployable subunit based at least in part on the dependency relationships.

9. The computer-implemented method of claim 8, wherein generating the independently deployable subunit based at least in part on the dependency relationships comprises:
extracting additional application components beyond the second application component, the second application component being dependent on the additional application components.

10. The computer-implemented method of claim 9, wherein the additional application components extracted comprise at least one of: a class; a package file; and a library file.

11. The computer-implemented method of claim 9, wherein generating the independently deployable subunit based at least in part on the dependency relationships further comprises:
generating a new application package file that is executable independent of the computing application.

12. The computer-implemented method of claim 4, further comprising:
converting code corresponding to the second application component from a first format to a second format different than the first format, wherein the independently deployable subunit comprises the code in the second format.

13. The computer-implemented method of claim 4, further comprising making the process accessible via the network endpoint in the second application component by:
identifying the local call as a call to a class or a method; and
modifying source code or bytecode of the computing application to create network accessibility code around the call to the class or method.

14. A non-transitory computer-readable medium comprising program instructions stored thereon that are executable by at least one computing device that, when executed, direct the at least one computing device to:
identify first and second application components based on analysis of a computing application, wherein the first and second application components represent different portions of the computing application;
generate a graph model comprising a plurality of nodes and a plurality of bridges connecting at least a portion of the nodes to other ones of the nodes, the nodes corresponding to application components of the computing application, wherein a respective one of the nodes is identified as being independently deployable based at least in part on a number of bridges connected to the respective one of the nodes being below a predetermined threshold;
identify a local call from the first application component to a process of the second application component;
create an independently deployable microservice from the computing application, the independently deployable microservice comprising the second application component having a network endpoint;
deploy the independently deployable microservice such that the process is accessible to the first application component via the network endpoint; and
programmatically refactor the local call into a network call from the first application component to the process of the second application component.

15. The non-transitory computer-readable medium of claim 14, wherein the at least one computing device is further directed to modify a source code file or a bytecode file of the computing application to remove the second application component.

16. The non-transitory computer-readable medium of claim 14, wherein the independently deployable microservice is created by:
identifying a plurality of dependency relationships for the second application component;
generating the independently deployable microservice based at least in part on the dependency relationships; and
extracting additional application components beyond the second application component, the second application component being dependent on the additional application components,
wherein the independently deployable microservice is created based at least in part on the dependency relationships by generating a new application package file that is executable independent of the computing application.

17. The non-transitory computer-readable medium of claim 14, wherein the at least one computing device is further directed to:
convert code corresponding to the second application component from a first format to a second format different than the first format, wherein the independently deployable microservice comprises the code in the second format.

18. The non-transitory computer-readable medium of claim 14, wherein the at least one computing device is configured to make the process accessible via the network endpoint in the second application component by:
identifying the local call as a call to a class or a method; and
modifying source code or bytecode of the computing application to create network accessibility code around the call to the class or method.

* * * * *